Patented Dec. 5, 1944

2,364,594

UNITED STATES PATENT OFFICE 2,364,594

PREPARATION OF ACID SALTS OF GUANYLTHIOUREA

Jack T. Thurston, Riverside, and Russell L. Sperry, Stamford, Conn., assignors to American Cyanamid Company, New York, N. Y., a corporation of Maine No Drawing. Application November 10, 1943, Serial No. 509,786

5 Claims. (Cl. 260—552)

This invention relates to a new method of preparing acid salts of guanylthiourea.

We have discovered that the guanylthiourea salts of acids having a dissociation constant of at least $1 \times 10^{-4}$ can be prepared from 2-thio-4,6-diamino-1,3,5-thiadiazine in accordance with the process described hereinafter. The compound, 2-thio-4,6-diamino-1,3,5-thiadiazine is believed to have the following structural formula:

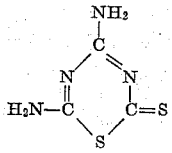

Chemical and physical properties of the compound indicate that it may also exist, in whole or in part, in one or more tautomeric forms such as: 2-thio-3-hydro-4-imino-6-amino-1,3,5-thiadiazine, 2-thiol-4-imino-6-amino-1,3,5-thiadiazine, etc. However, the structure represented graphically is believed to be the most likely configuration of the compound employed by us and designated herein as 2-thio-4,6-diamino-1,3,5-thiadiazine. The various tautomeric forms of the compound are also capable of being converted into salts of guanylthiourea as herein described and are to be considered as falling within the purview of our invention.

When 2-thio-4,6-diamino-1,3,5-thiadiazine, or one of its tautomers, is heated in the presence of water and an acid having a dissociation constant of at least $1 \times 10^{-4}$ the thiadiazine ring is cleaved and a molecule of water is added as shown,

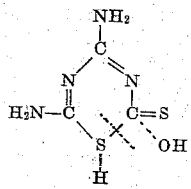

and a compound having the following possible structure is formed.

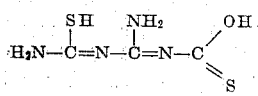

This latter compound rearranges in the presence of water, carbon dioxide and hydrogen sulfide are formed and eliminated from the reaction mixture and guanylthiourea.

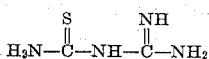

remains as the principal reaction product. Being in an acid media the guanylthiourea salt of the acid is formed. The acid salt may be recovered by crystallization, or by other means, as shown in the specific examples. If desired, guanylthiourea may be recovered as such by treatment of the guanylthiourea salt with an alkali or alkaline material which neutralizes the salt forming group. The guanylthiourea may also be obtained by treatment of a solution of the salt with an ammoniacal solution of a nickel salt which precipitates the guanylthiourea as a characteristic complex nickel salt. Further treatment with hydrogen sulfide yields free guanylthiourea.

Any acid or acidic material, whether organic or inorganic, having an acidity equal to that of an acid having a dissociation constant of at least $1 \times 10^{-4}$ may be used to prepare guanylthiourea salts from 2-thio-4,6-diamino-1,3,5-thiadiazine, or its tautomers. Among such acids are, specifically, glycolic, methoxyacetic, o-nitrobenzoic, o-chlorobenzoic, salicylic acid, 2,6-dihydroxybenzoic acid, formic, malonic, maleic, oxalic, phosphoric, p-toluene sulfonic, sulfurous, sulfuric, hydrochloric, nitric and others. Weaker acids such as acetic do not appear to be strong enough to cleave the thiadiazine ring and bring about the formation of guanylthiourea salts.

In preparing guanylthiourea salts in accordance with the present invention we prefer to make a slurry of the difficultly soluble 2-thio-4,6-diamino-1,3,5-thiadiazine in an aqueous solution of a strong acid of the class named and heat the slurry until the 2-thio-4,6-diamino-1,3,5-thiadiazine has dissolved. The amount of acid in the aqueous phase of the slurry may vary from about 1% to as high as 60% of acid. For convenience we prefer to heat the acid slurry at its reflux temperature although any temperature of from about 60° C. to 125° C., or higher, is suitable.

The length of time required for the conversion of 2-thio-4,6-diamino-1,3,5-thiadiazine to a guanylthiourea salt depends, of course, upon the temperature, the strength and concentration of the acid used. Under the most favorable conditions the conversion may reach a substantial degree of completion in 30 minutes. Under less favorable conditions the heating must be continued for 10, 15 or even 20 hours before sufficiently good yields of the guanylthiourea salt are obtained.

Our invention will now be illustrated by means of the following specific examples in which the preparation of 2-thio-4,6-diamino-1,3,5-thiadiazine and its subsequent conversion to various representative guanylthiourea acid salts is described. It will be understood, of course, that our invention is not to be limited to the use of the particular acids or reaction conditions named.

Example 1

A slurry of 1260 g. of dicyandiamide in 10 liters of acetone was cooled to 0° C. and 1955 g. of 85% potassium hydroxide pellets and 1000 cc. of carbon disulfide were then added with vigorous stirring. Before long the temperature began to rise steadily and the slurry became pale yellow. After three-fourths of an hour, the temperature was 17° C. and the slurry had become a thick cream of the insoluble yellow product. After 2.5 hours at a temperature between 10° C. and 20° C., the product was filtered, reslurried in a liter of cold acetone, filtered, washed with acetone and dried. The product was dipotassium ω-cyanoguanidodithiocarbonate.

To 1177 g. of dipotassium ω-cyanoguanidodithiocarbonate dissolved in 9 gallons of cold water was added slowly with stirring 650 cc. of glacial acetic acid. As the acetic acid was added, the solution became increasingly thick with a bulky white precipitate until at the neutral point the reaction mixture had become a thick slurry. During addition of the acetic acid the color of the slurry changed completely from a bright orange to a pale yellow color. The flocculent solid was centrifuged, and dried in an oven at 112° C. A yield of 616 g. of 2-thio-4,6-diamino-1,3,5-thiadiazine was obtained.

A slurry of 16 g. (0.10 mol) of 2-thio-4,6-diamino-1,3,5-thiadiazine and 25 g. (0.131 mol) of p-toluene sulfonic acid monohydrate in 250 cc. of water was heated to reflux for 2.5 hours. Hydrogen sulfide was evolved from the reaction mixture during this time. After the refluxing period, the solution was treated with activated charcoal and filtered. On cooling, crystals of guanylthiourea p-toluene sulfonate separated from the solution. A sample of the pure white product decomposed at 178–180° C. when heated. Chemical analysis of the crystals checked closely with the theoretical values for guanylthiourea p-toluene sulfonate as follows:

| Calc. for— | Percent N | Percent S |
|---|---|---|
| $C_2H_6N_4S \cdot C_7H_8O_3S$ | 19.30 | 22.07 |
| Found | 19.18 | 21.88 |
|  | 19.19 | 22.12 |

Qualitative tests with ammonical nickel solution proved the compound to be a guanylthiourea salt.

Example 2

A slurry of 16 g. of 2-thio-4,6-diamino-1,3,5-thiadiazine, 25 cc. of concentrated hydrochloric acid (37%) and 175 cc. of water was heated to reflux for 2 hours. The solution was then evaporated to one-third of its volume. The crystalline residue was found to consist of 85–90% of guanylthiourea hydrochloride and 10 to 15% of ammonium chloride. The guanylthiourea hydrochloride salt was later separated from impurities by fractional crystallization.

Example 3

16 g. of 2-thio-4,6-diamino-1,3,5-thiadiazine, 18.3 cc. of concentrated sulfuric acid and 150 cc. of water was heated under a reflux condenser for 2 hours. The solution was then cooled to 0° C. whereupon needle-like crystals were formed. Upon analysis these crystals were found to be 98% pure guanylthiourea acid sulfate. Upon evaporation of the mother liquor from the above crystallization to dryness an additional quantity of guanylthiourea sulfate was obtained with a small amount of unconverted 2-thio-4,6-diamino-1,3,5-thiadiazine.

Example 4

A slurry of 16 g. of 2-thio-4,6-diamino-1,3,5-thiadiazine, 10 cc. of concentrated nitric acid and 200 cc. of water was heated to reflux for 2 hours. The solution was then evaporated to a volume of 75 cc. and then cooled. A crop of crystals was formed which were later proven to be guanylthiourea nitrate of 98% purity. Upon evaporation of the mother liquor an additional quantity of guanylthiourea nitrate was obtained.

Example 5

16 g. of 2-thio-4,6-diamino-1,3,5-thiadiazine, 15 cc. of 85% o-phosphoric acid and 200 cc. of water was refluxed for four hours. The solution was then cooled whereupon 10.5 g. of guanylthiourea phosphate was crystallized. After separation of the crystals by filtration, the filtrate was evaporated to a volume of 50 cc. and cooled whereupon an additional 5.5 g. of guanylthiourea phosphate was obtained by crystallization.

Example 6

A slurry of 16 g. of 2-thio-4,6-diamino-1,3,5-thiadiazine and 20 g. salicylic acid in 200 cc. of water was refluxed for 11 hours. Hydrogen sulfide was slowly evolved during this time. The solution was treated with activated charcoal, filtered and then cooled whereupon crystals of guanylthiourea salicylate separated from solution.

Example 7

A slurry of 16 g. of 2-thio-4,6-diamino-1,3,5-thiadiazine, 11 g. of 87% formic acid and 175 cc. of water was refluxed for 13 hours. The reaction mixture was filtered while hot to remove unreacted 2-thio-4,6-diamino-1,3,5-thiadiazine and the filtrate evaporated to a small volume. Guanylthiourea formate was obtained from the concentrate.

We claim:

1. A method of preparing acid salts of guanylthiourea which comprises heating together 2-thio-4,6-diamino-1,3,5-thiadiazine, water and an acid having a dissociation constant of at least $1 \times 10^{-4}$ until a guanylthiourea acid salt has been formed.

2. A method of preparing acid salts of guanylthiourea which comprises heating together at temperatures of at least 60° C. 2-thio-4,6-diamino-1,3,5-thiadiazine, water and an acid having a dissociation constant of at least $1 \times 10^{-4}$ until a guanylthiourea acid salt has been formed.

3. A method of preparing guanylthiourea sulfate which comprises heating together at a temperature of at least 60° C. 2-thio-4,6-diamino, 1,3,5-thiadiazine, water and sulfuric acid until guanylthiourea sulfate has been formed.

4. A method of preparing guanylthiourea nitrate which comprises heating together at a temperature of at least 60° C. 2-thio-4,6-diamino-1,3,5-thiadiazine, water and nitric acid until guanylthiourea nitrate has been formed.

5. A method of preparing guanylthiourea p-toluenesulfonate which comprises heating together at a temperature of at least 60° C. 2-thio-4,6-diamino-1,3,5-thiadiazine, water and p-toluenesulfonic acid until guanylthiourea p-toluenesulfonate has been formed.

JACK T. THURSTON.
RUSSELL L. SPERRY.